United States Patent [19]
Inka et al.

[11] 3,897,072

[45] July 29, 1975

[54] SLIT RING WITH CONNECTING MEMBRANE

[75] Inventors: Egons Inka, Chicago; Raymond O. Shurson, Niles, both of Ill.

[73] Assignee: Crane Packing Company, Morton Grove, Ill.

[22] Filed: Feb. 12, 1973

[21] Appl. No.: 331,866

[52] U.S. Cl. .................................. 277/215; 277/9
[51] Int. Cl. ............................................. F16j 9/00
[58] Field of Search ........... 277/215, 1, 9, 237, 120, 277/121, 220, 202, 203; 29/156.6

[56] References Cited
FOREIGN PATENTS OR APPLICATIONS
46-32881  9/1971  Japan..................................... 277/9

Primary Examiner—Robert I. Smith

[57] ABSTRACT

An endless sealing ring of coherent compliant material is slit to leave a flexible membrane connecting the ends of the ring on opposite sides of the slit. The ring can then be either expanded or contracted depending upon how the slit or combination of slits is directed, to facilitate getting the ring over a cylindrical machine element or through a cylindrical recess in which a groove for the ring is located. The presence of the connecting membrane provides a barrier against leakage through the ring from slit to slit to lessen leakage across the ring. The invention can be applied to piston rings made of plastic material such as nylon or polytetrafluoroethylene as well as elastomeric material.

10 Claims, 18 Drawing Figures

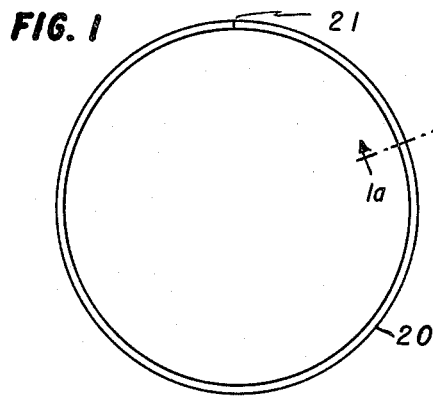
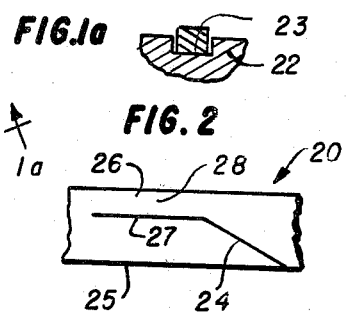
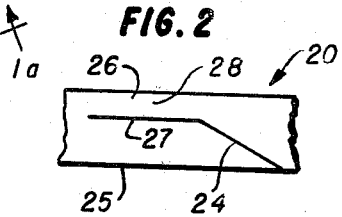
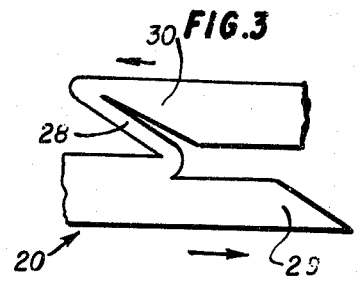
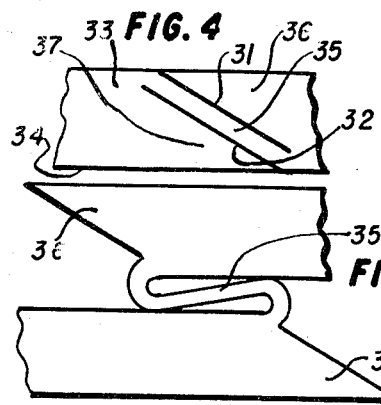
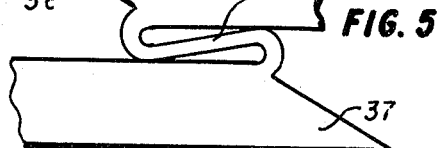
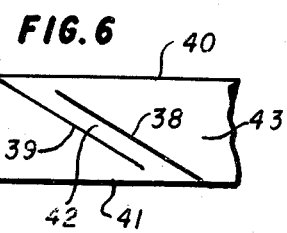
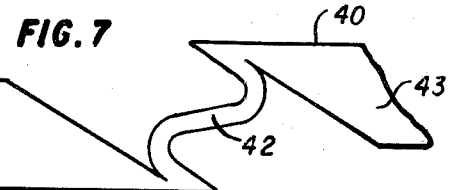
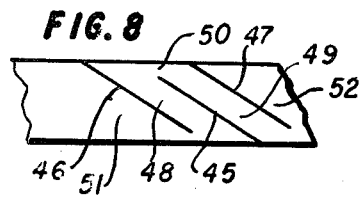
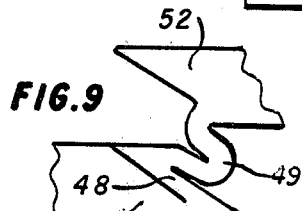
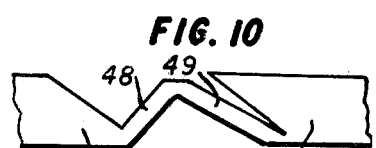
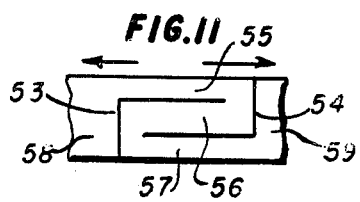
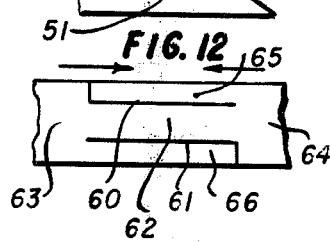
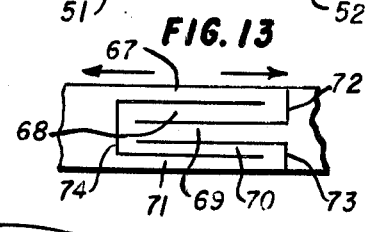
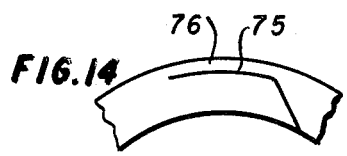
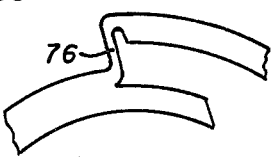
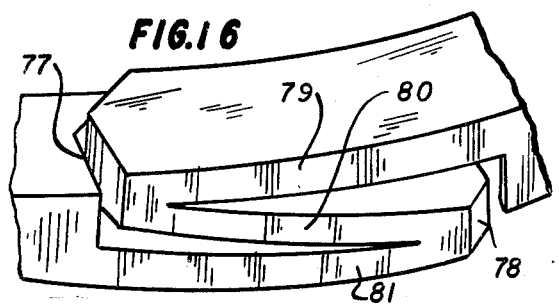
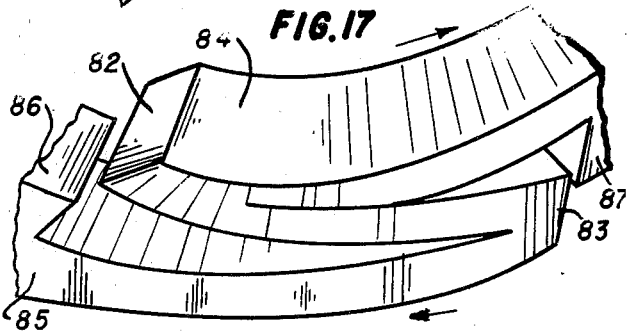

SLIT RING WITH CONNECTING MEMBRANE

This invention relates to endless sealing rings which are slit to make possible the expansion or contraction of the rings for easier insertion of the rings into the grooves provided therefor in a machine element.

Packing rings for sealing openings around shafts and piston rods have been made in segments, joined together by connectors to make it easier to hold them together while they are assembled as a shaft. Such rings are shown in U.S. Pat. Nos. 1,616,596; 648,474 and 1,320,567. The connectors shown in U.S. Pat. No. 1,616,596 are made from the material of the ring by cutting out portions of the ring. The connectors shown in U.S. Pat. No. 648,474 and 1,320,567 are made of wire. All are designed to permit the ring to be contracted as it is squeezed upon a shaft to effect a seal.

A more widely used form of ring, however, is the piston ring. This ring is intended to be received in a groove in one machine element and to bear radially upon a concentrically arranged element to effect a seal therebetween. In some forms, the groove is in a piston or shaft, requiring the ring to be expanded over the piston or shaft and slid axially until it falls into the groove. In other forms the groove is in a cylindrical cavity, and requires that the ring be contracted into the cavity and then slid axially until it can be expanded into its groove. Such rings can be made of compliant material such as nylon, polytetrafluoroethylene, elastomers and some of the resilient metals.

Piston rings made of materials other than the elastomers cannot be expanded or contracted sufficiently to permit their assembly into their grooves and hence must be cut or split for this purpose. The cut must be of such character as to close when the ring is installed and operative, otherwise the fluid to be sealed will escape through the cut. Thus, various forms of angle or overlapping cuts have been used to reduce leakage through the cut, reliance being placed upon axially or radially directed fluid pressure across the cut to hold it in tightly closed condition.

Despite the use of such angle or otherwise overlapping cuts, it has frequently been found that leaks through the joint still occur. Furthermore, rings originally molded in endless form tend to expand when cut, because of residual stresses in the material of the rings. Such expanded rings will not remain in their grooves during assembly unless held in some way which complicates the assembly process.

It is an object of this invention to provide a sealing ring of compliant material which is cut in a manner to enable it to be expanded or contracted for assembly purposes, but which nevertheless retains a connecting membrane between the cut ends to provide a barrier to the passage of fluid therebetween.

As a more specific object, this invention has within its purview the provision of a sealing ring of compliant material which is cut to enable it to be expanded or contracted for assembly pruposes, but which retains a flexible connecting membrane between the cut ends to provide a barrier to the passage of fluid therebetween, the membrane being such as to require a relative movement of the cut ends of the ring in a direction transverse to the walls of the groove in which the ring is retained, whereby to inhibit movement of the ring out of its groove during assembly of the grooved machine element with its cooperating element.

These and other objects of this invention will become apparent from the following detailed description of an embodiment thereof and of modifications of said embodiment as shown in the accompanying drawings in which:

FIG. 1 is a plan view of a ring of the type to which this invention is applicable;

FIG. 1a is a radial cross section through the ring of FIG. 1 taken along line 1a — 1a of FIG. 1, the ring being shown in a groove on an enlarged scale;

FIG. 2 is a fragmentary side view of a ring slit in accordance with this invention;

FIG. 3 is a side view of the ring of FIG. 2 showing how the ring can be contracted;

FIGS. 4 and 5 are fragmentary side and contracted views, respectively, of a modification of the slit shown in the ring of FIG. 2;

FIGS. 6 and 7 are fragmentary side and expanded views, respectively, of another modification of the slit of FIG. 2;

FIGS. 8 and 9 and 10 are fragmentary side, contracted and expanded views of a third modification of the slit of FIG. 2;

FIGS. 11, 12 and 13 are fragmentary side views of three additional modifications of the slit of FIG. 2;

FIG. 14 is a fragmentary plan view of the slit of FIG. 2 applied axially of the ring instead of radially as in FIG. 2;

FIG. 15 is a fragmentary view of the ring of FIG. 14 showing the ring in contracted form;

FIG. 16 is a fragmentary perspective view of a ring slit in the manner of the ring of FIG. 11 but with the abutting ends V-cut to inhibit axial movement thereof; and FIG. 17 is a fragmentary perspective view of the same cut as in FIG. 16, but with the abutting ends V-cut to inhibit radial movement thereof.

This invention is well adapted for use with rings designed to function as piston rings, one such ring shown at 20 in FIG. 1. Such rings are generally formed with square radial cross sections as shown in FIG. 1a. For certain applications they are made of a plastic material which when sufficiently thin is compliant so as to bend without fracturing. One such material is polytetrafluoroethylene, and rings made of this material are used in fluid-operated mechanisms such as the reciprocating pistons found in automatic automobile transmissions. This type of plastic cannot stretch readily and hence the rings are cut as at 21, either with a single angle cut, or with a lapped cut to permit the ring to be expanded over a piston shown fragmentally at 22 in FIG. 1 to drop into a groove 23 in piston 22. The angle or lapped form of cut is intended to cause the fluid pressure acting on the ring to close the cut and minimize leakage through the cut. It has been found that this objective is seldom attained in practice.

In accordance with this invention, the ring is not cut clear through, but is slit in such manner as to leave a flexible membrane connecting the cut ends. The manner in which the slit is made determines whether the ring may be expanded or contracted. Thus, referring to the cut shown in FIG. 2, a slit 24 is made radially through the ring in an angular direction relative to the axis of the ring form one side 25 of the ring toward, but not through to the other side 26 of the ring, leaving from one-fourth to one-third of the ring uncut. The angular slit 24 is then joined to the end of a circumferential slit 27 of a length selected to form a membrane 28 long enough to permit the desired relative movement of the cut ends shown in FIG. 3. Although slits 24 and 27 are shown as rectilinear, they may be curved, sinusoidal, stepped, sawtoothed or any combination of these forms of slits.

The membrane 28 of FIG. 3 allows the cut ends 29, 30 of ring 20 to be moved axially around one another and then circumferentially as shown to change the diameter of the ring. In the form of cut shown in FIG. 2, the ring cannot readily be expanded in diameter, but it can be contracted so that such ring is particularly well adapted to insertion in a groove which is formed in the interior of a cylindrical wall.

It may be noted from FIG. 1a that the groove normally provided for a sealing ring is very little wider than the width of the ring. To contract the ring of FIG. 2, however, it is necessary first to move the cut ends 29 and 30 sideways relative to one another, which means that once the ring is inserted into a groove, it will not change its diameter and hence will stay in place during assembly of the ring with its cooperating machine elements. Thus, in turn, eliminates special holding tools or techniques frequently required for assembling a sealing ring in a groove and constitutes an advantage of the present ring over prior art rings.

A special form of the ring of FIG. 2 is shown in FIGS. 4 and 5. In the FIG. 4, form instead of the two slits 24 and 27 of FIG. 2 being formed as extensions of one another, they are formed as substantially parallel slits 31, 32 disposed angularly to the sides 33, 34 of the ring and starting from opposite sides. A membrane 35 is formed by slits 31, 32 extending angularly across the ring from side to side and having its ends secured one to each side. The cut ends 36, 37 of the ring can be moved, first laterally of one another as with ends 29 and 30 of FIG. 2, and then past one another as shown in FIG. 5, to reduce the diameter of the ring.

Where it is desired that the cut ring be expansible to fit into a groove in a shaft or piston, the form of ring shown in FIG. 6 may be used. In this form two angular substantially parallel slits 38, 39 are made, but slit 38 is made to extend into the acute angle formed by the intersection of slit 39 and side 40, and slit 39 is made to extend into the acute angle formed by the intersection of slit 38 with side 41 of the ring. This enables membrane 42 to function in the manner of a bellows and permits cut side 43 of the ring to be pulled away from cut side 44 as shown in FIG. 7 to allow the ring to be expanded, or to inhibit substantial contraction of the ring.

As in the FIG. 2 and FIG. 4 forms, a change in the diameter of the ring of FIG. 6 is accompanied by a lateral movement of the cut ends 43 and 44 relative to one another and hence the ring of FIG. 6 possesses the quality of resisting a change in diameter once it is installed in a groove.

Should it be desired to incorporate both expansion and contraction capabilities into a single ring to reduce inventory, the ring of FIGS. 8, 9 and 10 may be used. This ring has substantially the same two slits 45 and 46 as the slits 38 and 39 of FIG. 6, with a third slit 47 parallel with slit 45 and forming the same combination and disposition of slits as are found in FIG. 4. Two membranes 48 and 49 are formed, the membranes being joined together at 50 and to the cut ends 51, 52 of the ring at their opposite ends to form a single fold bellows.

If it is desired to contract the ring, then the cut ends 51 and 52 are manipulated as in FIG. 4, membrane 48 remaining as part of cut end 51 and membrane 49 being flexed as shown in FIG. 9. If it is desired to expand the ring, cut ends 51 and 52 are pulled apart and membranes 48 and 49 function as a single fold bellows to permit the expansion of the ring.

The modifications shown in FIGS. 11, 12 and 13 are designed to permit expansion, contraction and expansion respectively of a ring, but the slits are formed as rightangular slits instead of the angular slits of FIGS. 4 and 6. The right-angular slits of FIG. 11 are shown at 53 and 54 and form three connected membranes 55, 56 and 57 which provide a higher degree of expansion of the cut ends 58 and 59 of the ring inasmuch as the total expansion approaches the sum of the lengths of the three membranes whereas in FIG. 6, the expansion approaches the length of only one membrane.

In FIG. 12, only contraction is possible the right-angular slits 60 and 61 forming only a single membrane 62 connecting the cut ends 63, 64 of the ring. This modification permits contraction of the ring with the least lateral movement of the cut ends 63, 64, since it is only necessary to move the ends relative to one another a distance equal to the thickness of the flaps 65 or 66 formed on either side of membrane 62 by the slits 60 and 61.

In FIG. 13, the available expansion is increased over that of FIG. 11 by forming five connected membranes 67, 68, 69, 70 and 71 with two right-angular slits 72, 73 from opposite sides of the ring and a third slit 74 of U-shape extending around the internal ends of slits 72 and 73 and into the angles formed by said slits 72, 73. This construction results in a form of double bellows arranged side-by-side in an axial direction on either side of the central membrane 69.

The slits shown in FIGS. 2 through 13 are all made in radial planes relative to the axis of ring 20 of FIG. 1. Substantially the same kinds of slits can be made in an axial direction relative to the axis of the rings with the same expansion and contraction capabilities as in the rings of FIGS. 2–13, except that the lateral movement of the cut ends relative to one another is eliminated. Thus slit 75 in FIG. 14, which has the same general configuration as slits 24, 27 of FIG. 2, extends axially of the ring and results in a membrane 76 providing the same contracting capability (FIG. 15) as the radial slit of FIGS. 2 and 3.

Although the various membranes disclosed in FIGS. 2–15 have a degree of stiffness in a plane parallel with the slits forming the membranes, where the membrane is made thin to provide maximum flexibility, the cut ends can be moved relative to one another in the planes of the slits which may be undesirable from the standpoint of assembly of the ring into its groove. To provide a degree of protection against such relative movement of the ends, the constructions shown in FIGS. 16 and 17 can be used.

In FIG. 16, which shows as an example the FIG. 11 form of slits, the slits 77 and 78 are made V-shaped to inhibit relative movement of the cut ends in the plane of the membranes 79, 80 and 81. In FIG. 17, wherein the same configuration of slits is shown as in FIG. 10, the slits 82, 83 are cut at an acute angle with reference to the sides 84, 85 of the ring so that a form of interlock is formed with the cut ends 86, 87 of the ring to hold the ends of the ring together against residual stresses in the ring. Said interlock yields readily, however, to normal forces impressed upon the cut ends during removal of the ring from its groove, since it is made of material which is compliant and flexes when forced.

The presence of the membrane in each of the forms disclosed herein forms a barrier to the passage of fluid from one side of a ring to the other between the cut ends and hence reduces or eliminates leakage through the ring. Although the membrane is relatively thin and flexible it is supported by a wall either of the groove in the case of the radial cut ring, or by the cylinder wall or by the bottom of the groove in the case of the axial cut ring and hence is protected against rupture by fluid pressure.

Although the rings described above have been described as made of polytetrafluoroethylene, they may be made of elastomers and of any compliant material including nylon, vinyl chloride and some of the more ductile metals. The slits may be made from any angle and not necessarily in radial or axial planes as disclosed herein above. The rings need not be of the type which are received in grooves, but the invention may be applied to packing rings placed side-by-side in a stuffing box. It is understood therefore that the scope of this invention is not limited to the examples shown herein, but is to be determined by the appended claims.

We claim:

1. An endless sealing ring of compliant material having a transversely disposed slit therein extending from one surface thereof toward and spaced from an oppositely disposed surface thereof and forming with said oppositely disposed surface a flexible membrane; at least a portion of said slit having a component of direction parallel to said oppositely disposed surface the portions of the ring adjacent said membrane being relatively movable to bend said membrane upon itself and thereby change the diameter of the ring, whereby to facilitate assembly of the ring into an annular groove.

2. An endless ring as described in claim 1, said oppositely disposed surface comprising a surface formed by a second slit in said ring commencing from the surface of the ring opposite that of said one surface, and said second slit extending toward said one surface.

3. An endless sealing ring as described in claim 1, said transversely disposed slit extending radially into said ring from side to side of said ring and then circumferentially of said ring, and said oppositely disposed surface comprising a surface formed by a second slit in said ring disposed substantially parallel with said transversely disposed slit, and said second slit extending into the ring from a surface of said ring opposite said one surface of said ring.

4. An endless ring as described in claim 3, said second slit extending between the circumferentially extending portion of the transversely disposed slit and said one surface of the ring.

5. An endless ring as described in claim 3, said second slit extending between the circumferentially extending portion of the transversely disposed slit and the surface of said ring opposite said one surface of said ring.

6. An endless sealing ring as described in claim 3, the portion of said first-mentioned slit extending toward the opposite surface forming substantially a V in a surface of the ring to interlock the portions of the ring at the slit against relative movement in one direction.

7. An endless ring as described in claim 1, said slit having a first portion angularly disposed with reference to said one surface of the ring and a second portion extending parallel with said oppositely disposed surface.

8. An endless ring as described in claim 1, said slit extending radially of said ring.

9. An endless ring as described in claim 1, said slit extending axially of said ring.

10. An endless sealing ring as described in claim 1, a second slit extending toward and then parallel with the first-mentioned slit, and a third slit of substantially U-shaped form extending around the ends of the first and second slits and then parallel with the said first and second slits.

* * * * *